United States Patent [19]
Sano et al.

[11] 3,883,883
[45] May 13, 1975

[54] REMOTE CONTROL DEVICE FOR CAMERA

[75] Inventors: Yozo Sano, Fujiwasa-shi, Kanagawa-ken; Sadahiko Tsuji, Yokohama; Yukio Mashimo, Tokyo; Masaharu Ito, Kawasaki-shi, Kanagawa-ken, all of Japan

[73] Assignee: Canon Kabushiki Kaisha, Japan

[22] Filed: Sept. 20, 1973

[21] Appl. No.: 399,192

[30] Foreign Application Priority Data
Sept. 22, 1972 Japan............................ 47-95300
Sept. 22, 1972 Japan............................ 47-110317

[52] U.S. Cl. ........... 47-110316; 178/7.92; 352/140; 354/198
[51] Int. Cl. ............................................ H01J 29/89
[58] Field of Search ........ 354/75, 76, 79, 195, 198, 354/200; 178/6.7 R, 7.92; 352/140; 355/43, 37, 55, 20

[56] References Cited
UNITED STATES PATENTS

| 2,782,253 | 2/1957 | Allanson............................ 178/7.92 |
| 2,838,600 | 6/1958 | Salinger............................ 352/140 X |
| 2,968,215 | 1/1961 | Goodman............................ 355/20 X |
| 2,981,791 | 4/1961 | Dixon............................ 355/37 X |
| 3,198,883 | 8/1965 | Borberg et al............................ 178/7.92 X |
| 3,258,531 | 6/1966 | Reindl et al............................ 178/7.92 X |
| 3,364,815 | 1/1968 | Smith et al............................ 352/140 X |
| 3,435,136 | 3/1969 | Bachmann et al............................ 178/7.92 X |
| 3,541,941 | 11/1970 | Barr et al............................ 354/195 |
| 3,682,072 | 8/1972 | Hess et al............................ 355/55 X |

Primary Examiner—Richard A. Wintercorn
Attorney, Agent, or Firm—McGlew and Tuttle

[57] ABSTRACT

The image pick up optics and the image pick up tube of an image pick up device, such as a television camera are arranged so that they are opposed to the eye piece of the view finder of a photographic camera. The optical axes of the viewfinder and of the image pick up optics are coaxially aligned. The image pick up optics includes a distance defining ring which is releasably coupled to a fixed ring at a position, of the distance defining ring, in which the image of the object, provided by the image pick up optics, is formed on the light receiving plane of an image pick up tube of the image pick up device. A television monitor is connected to the image pick up device, and a distance defining ring of the photographic camera is operable by a driving source remotely controlled from the monitor.

5 Claims, 9 Drawing Figures 3,883,883

REMOTE CONTROL DEVICE FOR CAMERA

BACKGROUND OF THE INVENTION

1. Field of the Invention

The present invention relates to a remote control device of a camera, especially a device with which the image of the object can be observed by means of a television monitor.

2. Description of the Prior Art

It has already been known to equip a camera with a motorized film winding up device so as to automate the releasing of the shutter as well as the winding up of the film in such a manner that the camera can be remotely controlled. In case the of such already known cameras, it is possible to remotely control the releasing of the shutter as well as the winding up of the film and so on fully automatically, while there are such disadvantages that the photographing is carried out without knowing what the object is or a sharp image could not always be obtained when the distance between the object and the camera is varied.

One of the objects of the present invention is to offer provide a device with which the image of the object in the view finder can be observed by means of a television monitor so as to avoid the above mentioned disadvantages.

Another object of the present invention is to provide a device with which the image of the object in the view finder can be formed on the light receiving plane of the image pick up tube by means of an image pick up optics so as to adjust the focus of the monitor image automatically.

Still another object of the present invention is to provide a device with which the object can be observed directly by means of the image pick up optics.

DESCRIPTION OF THE PREFERRED EMBODIMENTS

Figure 1:
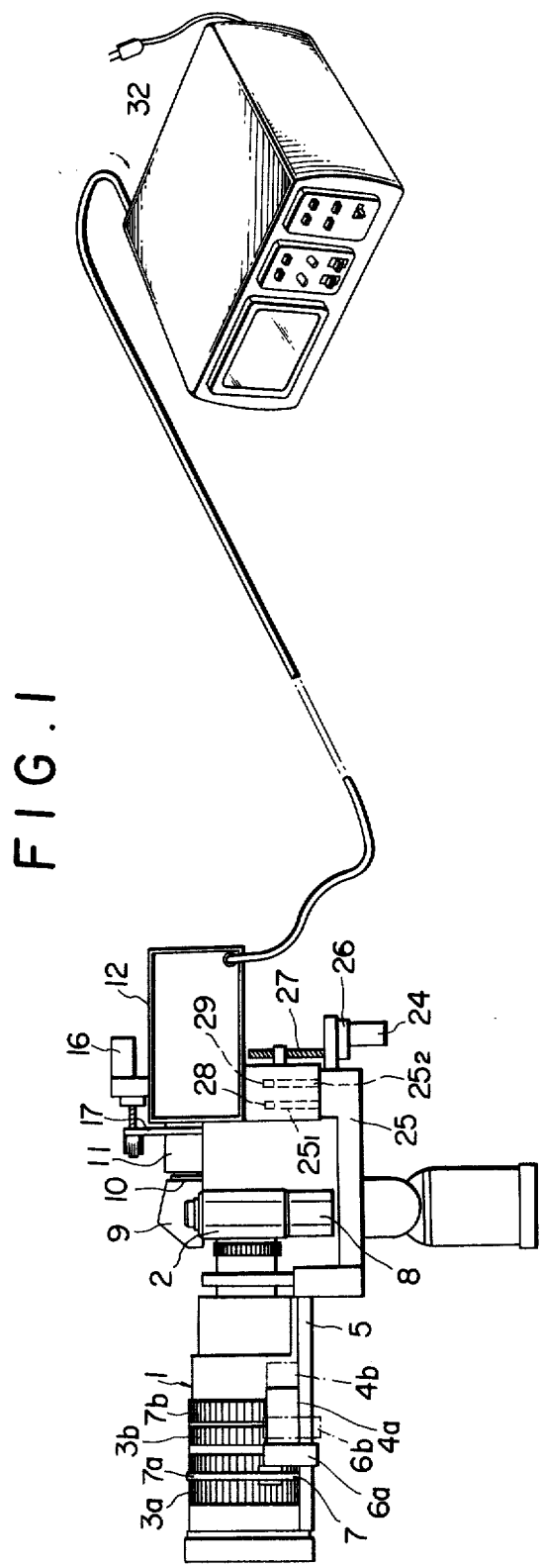
FIG. 1 shows an embodiment of the remote control device of a camera according to the present invention.

The present invention will be explained referring to the drawing of embodiments according to the present invention.

FIG. 1 shows the device according to the present invention as a whole, wherein 1 is a zoom lens forming the photographing lens of a single reflex camera 2, 3a is the zoom ring of the zoom lens 1 and 3b is the distance defining ring of the zoom lens 1. On the periphery of the zoom ring 3a, and on the periphery of the distance defining ring 3b, respective toothed parts are formed. 4a and 4b are motors mounted on the support 5, 6a and 6b are respective reduction gears therefor. Belts 7a and 7b are trained around the output shafts of reduction gears 6a and 6b, respectively, and also around the toothed parts of zoom ring 3a and distance defining ring 3b, so that rings 3a and 3b are driven by the respective motors 4a and 4b. 8 is a motorized winding up unit mounted on the bottom surface of the camera, 9 is the pentaprism of the view finder optics of the camera, 10 is the eye piece and 11 is the image pick up lens of a television camera 12 whose details pertinent to the present invention are shown in FIG. 2.

Figure 2:
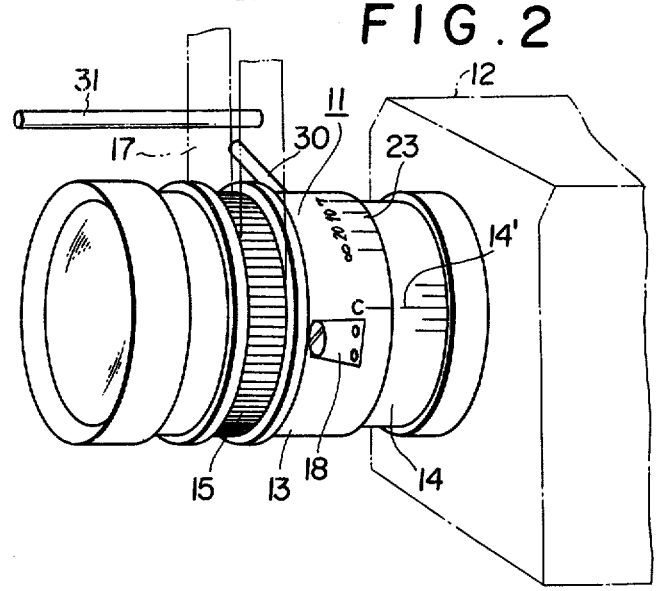
FIG. 2 is a perspective view of the image pick up optics of FIG. 1.
Figure 3:
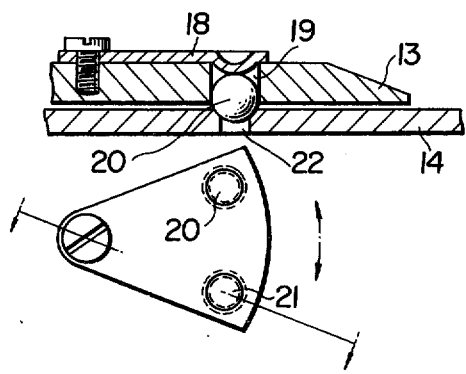
FIG. 3A is a sectional view of the mechanism to releasably couple the distance defining ring with the fixed ring.
FIG. 3B is a plan view of the mechanism shown in FIG. 3A.

In FIG. 2, the lens 11 of the television camera 12 presents the distance defining ring 13 and the fixed ring 14, whereby the distance defining ring 13, which is rotated, is displaced along the optical axis so as to define the distance. 15 is a toothed part provided on distance defining ring 13, and a geared belt 17 is trained around toothed part 15 and the output shaft of a motor 16 mounted on television camera 12. 18 is a plate spring fixed on the distance defining ring 13, whereby the balls 20 and 21 are retained in a hole 19 provided in distance defining ring 13. On the distance defining ring 13, the distance scale 23 is provided, whereby the fixed mark 14', provided on the fixing ring 14 is set at the mark "C" provided on the distance defining ring 13 when the distance is defined at the nearest point and the image of the object in the view finder is focused. At such time, balls 20 and 21 engage in a hole 22 provided on the fixed ring 14 in such a manner that the rings 13 and 14 are releasably coupled to each other. 24 is a motor fixed on a support frame 25 and its speed is reduced by a reduction gear 26 in such a manner that a member 29, threadedly engaged with the worm gear 27 fixed on the output shaft of gear 26, is displaced upwards and downwards.

28 is a movable body formed unitarily with the member 29 and held and guided along the vertical direction by guide elements $25_1$ and $25_2$ on the support frame 25. On the distance defining ring 13, a disengagement pin 30 is provided in such a manner the disengagement pin 30 can engage with an engagement pin 31 provided on the support frame 25. 32 is a television monitor connected with the television camera 12.

When, in the above mentioned construction, the camera is set in the state shown in FIG. 1 while the motor 16 is energized by means of an operation button on the television monitor 32 so that the distance defining ring 13 is rotated by belt 17, the distance defining ring 13 and the fixed ring 14 are releasably coupled to each other when the balls 20 and 21 fall into the hole 22 provided on the fixing ring 14, namely, when the mark C is aligned with the fixed mark 14' on the fixing ring 14. Because the motor 16 is equipped with a friction transmission mechanism not shown in the drawing, the motor 16 continues its rotation while the distance defining ring 13 remains stationary when both rings are releasably coupled to each other. In the above mentioned state the image of the object in the view finder of the camera 2 is formed on the plane of the image pick up tube in the television camera 12 through the image pick up lens 11 in such a manner that, on the cathode ray tube of the television monitor 32, the image of the object, at which the photographing lens 1 of the camera 2 is aimed appears. In order to observe other objects in the neighborhood of the object at which the photographing lens 1 is aimed the motor 24 is remotely energized by a control on the television monitor 32, so as to displace movable body 28 upwardly. Thus, the television camera 12 is moved upwardly so that the optical axis of the image pick up lens 11 is displaced out of alignment with the optical axis of the viewfinder optics of photographic camera 2. Thereby, the television camera 12 can "view" other objects in the neighborhood of the object at which photographing lens 1 is aimed, and these other objects will appear on monitor 32. Thus the background of the object at which photographing lens 1 is aimed can also be observed. At the time of the displacement of the movable body 28, the disengagement pin 30 on the distance defining ring 13 engages with the fixed pin 31, so that a force is exerted on pin 31 by pin 30. This force is sufficient to disengage the releasable coupling between distance defining ring 13 and fixed ring 14, so that balls 20 and 21 are disengaged from hole 22. Consequently, ring 13 can again be rotated by motor 16 so that it is possible to adjust ring 13, by such rotation, to define the distance between the image pick up lens 11 and the object to be photographed by rotating ring 13 of the image pick up lens under remote control from monitor 32.

In case the object caught by the image pick up lens is confirmed to be the desired object by the observation of the monitor 32, the photographic angle is defined by rotating the zoom ring in such a manner that the object caught by the image pick up lens is contained in the photographic angle, while the movable body 28, together with television camera 12, is displaced downwardly by operation of motor 24 under remote control from monitor 32, to realign the optical axis of image pick up lens 11 with that of the viewfinder optics of photographic camera 2. Thereby the image of the object can be observed by means of the monitor when the rings 13 and 14 are releasably coupled with each other. After this the releasing of the shutter and the winding up of the film in the camera is carried out by supplying a releasing signal from the monitor 32.

In case the optics of the image pick up lens 11 is situated on the plane of the eye piece of camera 2, the operation by the television monitor becomes remarkably simplified, because the image pick up lens is releasably held at the position at which the image of the object in the view finder is focused on the plane of the image pick up tube so that the image can be focused automatically by controls at the television monitor. In case the optical axis of the photographic camera view finder is deviated from that of the image pick up lens 11, it is possible to photograph the object to be photographed correctly because other objects in the neighborhood of the object at which the photographing lens 1 is aimed can be monitored in such a manner that the desired object can be observed and caught from the television monitor, which is very advantageous because wasted photographs can be avoided.

The optical relation between the optics of the view finder shown in FIG. 1 and those of the image pick up will now be explained according to FIGS. 4 to 7.

In the case of an view finder of the ordinary camera, the eye point is usually situated 10 – 20mm behind the eye piece so that the frame of the eye piece interferes with the front frame of the image pick up lens 11 in case an ordinary lens is used for picking up an image.

Figure 4:
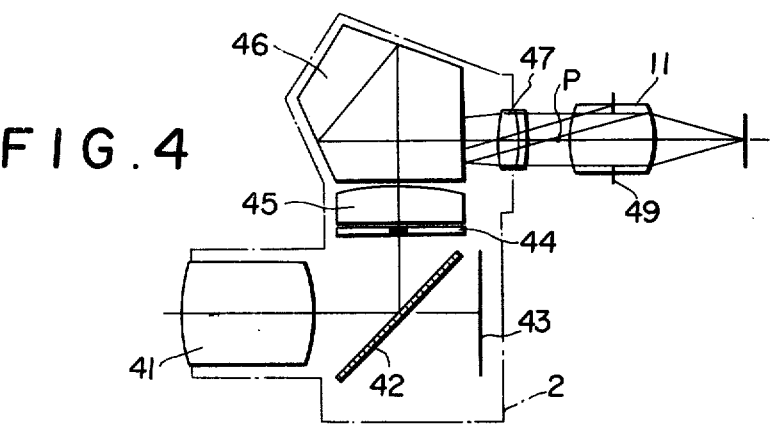
FIG. 4 is a schematic illustration of the optical relation between the view finder optics of the camera and the image pick up optics of the image pick up device, when the eye point does not coincide with the angle of incidence.

Consequently it becomes difficult to make the eye point of the image pick up lens coincide with the eye point of the view finder so that there is a danger that the light quantity around the image to be photographed is insufficient, or, in the worst case, a part of the image is interrupted. FIG. 4 shows the above mentioned state. In the drawing, 41 is the photographing lens, 42 a movable mirror, 43 the film, 44 a focusing plate, 45 a condensor lens, 46 a pentaprism and 47 an eye piece, constituting the optics of the above mentioned single reflex camera 2. 11 is the image pick up lens of the television camera attached on the camera 2, and 49 is the incidence iris of this image pick up lens. P is the eye point of the eye piece and the above mentioned disadvantage occurs because the eye point does not coincide with the incidence iris 49.

In case, on the other hand, the focus distance is not chosen in a proper way, only a part of the image in the view finder, or an undesired part around the desired image is photographed.

Under such circumstances, the present invention offers also the following conditions in order that a good picture can be obtained, whereby there is no danger that the part around the image should be dark or a part of the image should be interrupted.

Figure 5:
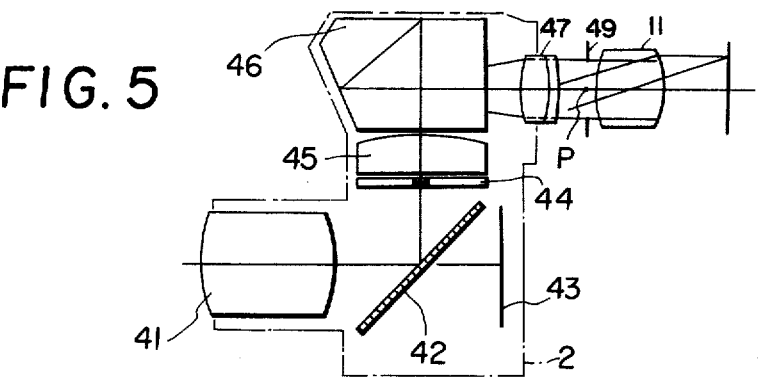
FIG. 5 is a schematic illustration of the optical relation between the view finder optics of the camera and the image pick up optics of the image pick up device, when the eye point coincides with the angle of incidence.
Figure 6:
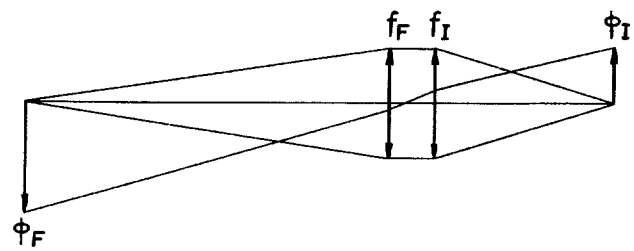
Fig. 6 graphically illustration the roles of various optics to form the image of the object on the plane of the image pick up tube.

1. The incidence iris of the television camera image pick up lens 11 should be situated within ± 5mm from the eye point of the view finder of the camera 2. This is the condition that the light quantity around the image to be photographed should not be insufficient and FIG. 5 shows the case when such eye point P coincides with the incidence iris 49. Hereby (+) means the direction away from the view finder. Practically the deviation in the (−) direction can be a little more than 5mm. In case this condition is not fulfilled, there is a danger that the light quantity around the image will be short, or a part of the image will be interrupted.

2. The second condition is as follows according to FIG. 6;

$$0.9 \frac{\phi_1}{\phi_F} f_F < f_1 < 1.1 \frac{\phi_1}{\phi_F} f_F$$

wherein $\phi_F$ : The size of the image in the view finder.

$f_F$ : Combined focus distance of the eye piece in the view finder and the condensor lens.

$\phi_1$ : The size of the image on the image pick up lens.

$f_1$ : Focus distance of the image pick up lens.

This is the condition in order that the image in the view finder be photographed in a proper size. However, as it is the perfect condition, there is no problem in practice in case the deviation is within ± 20 percent. In case further the light flux issuing from the eye piece is set in an afocal way, the following condition is satisfied:

$$\frac{\phi_1}{\phi_f} f_f = f_1$$

so that the total range of the image in the view finder can be photographed when $f_1$ is chosen so as to satisfy the above mentioned conditions in the case the ratio of the size in vertical direction to that in horizontal direction of the image in the view finder is same as that of the image to be photographed. However, due to other subsidary conditions such as that the light flux emerging from the eye piece is not afocal in practice, that the ratio of the size in vertical direction to that in horizontal direction of the image in the view finder is not exactly the same as that of the image to be photographed and that informations other than the image are photographed at the same time, it is sufficient to choose $f_1$ according to the above mentioned condition.

Figure 7:
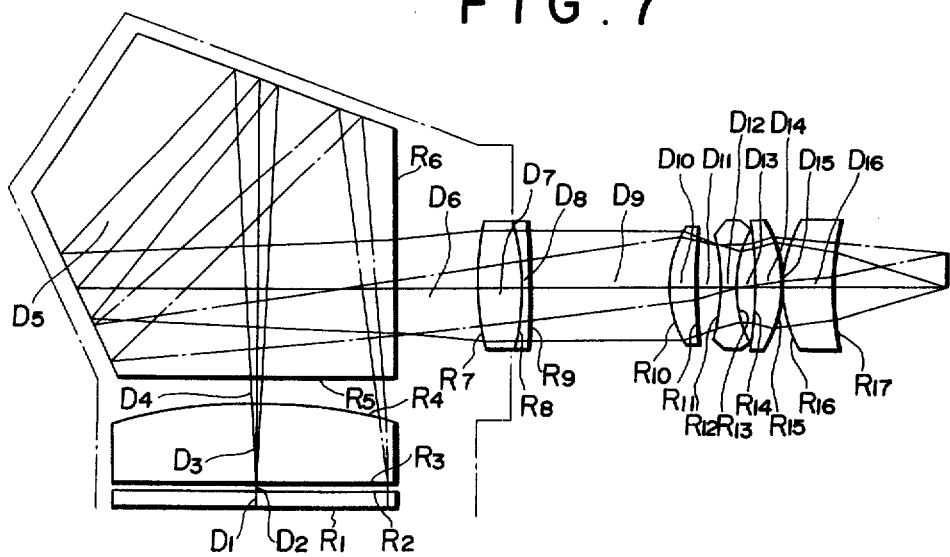
Fig. 7 is an optical diagram showing the optical path of FIG. 5 concretely.

The present invention will now be explained according to an embodiment thereof as shown in FIG. 7.

In FIG. 7:

| | R | D | N | V |
|---|---|---|---|---|
| 1 | ∞ | 1.5 | 1.493 | 54.2 |
| 2 | ∞ | 0.2 | | |
| 3 | | 7.5 | 1.51633 | 64.1 |
| 4 | −52.05 | 2.3 | | |
| 5 | ∞ | 82.39 | 1.51633 | 64.1 |
| 6 | ∞ | 7.45 | | |
| 7 | 67.954 | 3.6 | 1.63854 | 55.4 |
| 8 | −26.8664 | 0.9 | 1.61293 | 37.0 |
| 9 | −235.42 | 12. | | |
| 10 | 9.479 | 2.9 | 1.7725 | 49.6 |
| 11 | 78.642 | 2.03 | | |
| 12 | −18.002 | 1. | 1.71736 | 29.5 |
| 13 | 9.618 | 1.79 | | |
| 14 | −71.365 | 2.6 | 1.62299 | 58.2 |
| 15 | −10.503 | 0.1 | | |
| 16 | 12.675 | 4.6 | 1.62299 | 58.2 |
| 17 | 30.05 | | | |

R : Radius of curvature on the refraction plane of lens
D : Thickness of lens on the optical axis or of air gap
N : Index of refraction of lens (with regard to the d line)
V : Abbe's number of the lens.

Let the distance between the eye point of the view finder of the photographic camera 2 and the incidence iris of the image pick up lens 11 on the optical axis be 0, so $$\phi_f = 41.97$$
$$f_f = 68.89669$$
$$\phi_1 = 11.0$$
$$f_1 = 18.48713 = 1.024 \cdot \frac{\phi_f}{\phi_1} f_f$$

Consequently by releasably coupling rings 13 and 14 with each other the optics of the view finder of the single reflex camera 2 and the optics of the image pick up device 11 conjointly an optics which presents the above mentioned optical figures.

Figure 8:
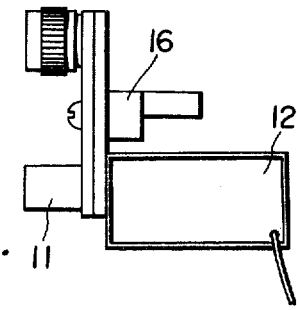
FIG. 8 is an elevation view of a variation of FIG. 2.

Further it is possible to catch objects other than the object at which the photographing lens aims with various angles in case, instead of the image pick up lens shown in FIG. 1, an image pick up lens of a turret system, as shown in FIG. 8, is used and the turret is operated by a motor controlled from the monitor.

Figure 9:
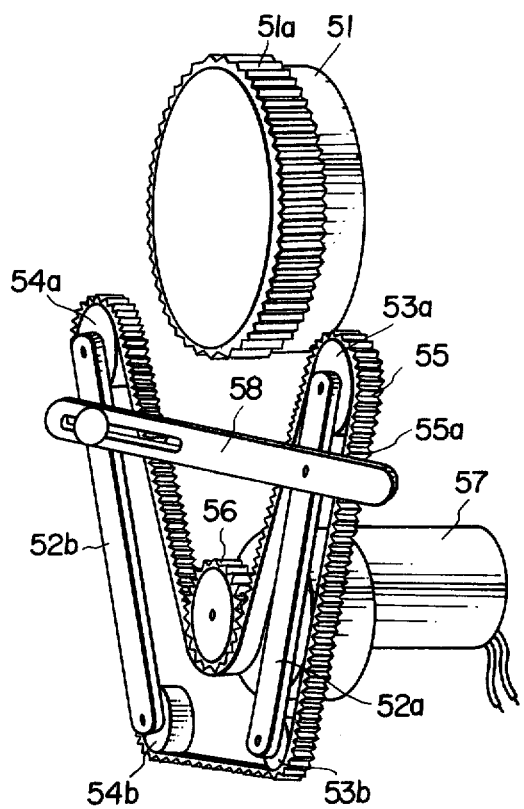
FIG. 9 is a perspective view of another embodiment of the transmission mechanism to adjust the zoom ring and the distance defining ring, shown in FIG. 1, by means of a driving source.

FIG. 9 shows another embodiment of the transmission mechanism to adjust the zoom ring, shown in FIG. 1, and the distance defining ring by means of a driving source. Namely 51, is the ring of the zoom ring, the distance defining ring and so on, whereby, on the periphery of the ring 51, a toothed part 51a is formed. 52a and 52b are levers opposed to each other, whereby the lever 52a is fixed at both ends, while the lever 52b is rotatably pivoted at one end. 53a and 53b are rollers respectively pivoted at opposite ends of the lever 52a, while 54a and 54b are rollers respectively pivotted at opposite ends of the lever 52b. 55 is a rubber belt trained over rollers 53a, 53b, 54a and 54b. On the external face of the rubber belt 55, a toothed part 55a, which has the same pitch as that of the above mentioned toothed part 51a is formed. 56 is a driving gear fixed on the driving shaft of the motor 57, whereby the driving gear 56 is in driving engagement with belt 55 in such a manner that there is formed a loop in the belt 55. This driving gear 56 and the motor 57 are displaceable upwards and downwards by means of a mechanism not shown in the drawing, whereby the lever 52b is rotated in such a manner that the toothed part 55a of the belt 55 engages with the toothed part 51a of the ring 51, in the case of the upward displacement, while the toothed part 55a and the toothed part 51a are disengaged from each other as shown in the drawing, in the case of the downward displacement. 58 is an adjusting lever connected between the levers 52a and 52b to adjust the distance between them, whereby lever 58 is pivotted on the lever 52a at the one end, an is fixed on the lever 52b by means of a screw 58a at the other end through a long slot provided in the lever 58. By loosing the screw 58a the lever 52b becomes rotatable.

When the motor 57 as well as the driving gear 56 is displaced downward after loosing the screw 58a in the state shown in the drawing, the lever 52b is rotated in such a manner that the toothed part 55a of the belt 55 engages with the toothed part 51a of the ring 51. When the motor 57 is energized after securing the screw 58a, the ring 51 is rotated through the gear 56 and the belt 55. When the motor 57 is stopped after a desired rotation, the screw 56a is loosened and the motor 57 and the gear 56 are displaced upwards, whereupon lever 52b returns to the original position. The original state is reestablished when the screw 58 is again secured.

A driving transmission mechanism as mentioned above is very simple in composition, because, by engaging the toothed part of a body to be driven such as zoom ring with the concave part of the belt, the driving power from the motor or the like is transmitted, whereby the engagement as well as the disengagement of the transmission can easily be carried out so that the effect in practice is remarkably large.

What is claimed is:

1. A remote control photographing system comprising, in combination, a photographic camera having a viewfinder optical system including a photographing lens providing an image of a scene at a focusing plane; an image pick up device having an image pick up optical system including a distance adjusting means, for setting the distance of said image pick up optical system, and having an image pick up tube including a photosensitive plane for forming an image of a scene viewed by said image pick up optical system; displacement means operable to displace said image pick up device between a first position, in which the optical axis of said image pick up optical system is aligned with the optical axis of said viewfinder optical system for viewing of the image in the focusing plane of said viewfinder optical system, and a second position in which the optical axis of said image pick up system is out of alignment with that of said viewfinder optical system for direct viewing of a scene by said image pick up optical system; locking means operable to releasably latch said distance adjusting means at the shortest distance setting in which the image in the focusing plane of said viewfinder optical system is focused on the photosensitive plane of said pick up tube with said image pick up device in said first position; release means operable to release said locking means responsive to displacement of said image pick up device to said second position by said displacement means; and a television monitor connected to said image pick up tube and operable to display the image formed on said photosensitive plane, said television monitor including selectively operable operative means controlling said distance adjusting means and said displacement means.

2. A remote control photographing system, as claimed in claim 1, wherein said photographing lens of said viewfinder optical system of said photographic camera is a zoom lens having a zoom ring; said television monitor including further selectively operable operative means controlling said zoom ring.

3. A remote control photographing system, as claimed in claim 2, in which said zoom lens of said viewfinder optical system includes a distance adjusting ring for adjusting the distance of said zoom lens; said television monitor further including selectively operable operative means controlling said distance adjusting ring of said zoom lens.

4. A remote control photographing system, as claimed in claim 1, in which said image pick up optical system includes an image pick up lens having an entrance pupil; said viewfinder optical system including an eye point; said entrance pupil, in said first position of said image pick up device, being located on the optical axis of said viewfinder optical system with +5mm of said eye point.

5. A remote control photographing system, as claimed in claim 4, in which said viewfinder optical system includes a condenser lens and an eye piece, the optics of said image pick up optical system satisfying the following conditions:

$$0.7 \frac{\phi_1}{\phi_F} f_F < f_1 < 1.2 \frac{\phi_1}{\phi_F} f_F$$

wherein $\phi_F$ is the size of the image in the viewfinder, $f_F$ the combined focus distance of the condenser lens and the eye piece, $\phi_1$ the size of the image to be photographed and $f_1$ the focus distance of the image pick up optical system.

* * * * *